US012795443B2

(12) United States Patent
Sharma et al.

(10) Patent No.: US 12,795,443 B2
(45) Date of Patent: Nov. 10, 2026

(54) HEADER COMPRESSION ADAPTIVE TO QUALITY OF RADIO CHANNEL

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 150 days.

(21) Appl. No.: 17/428,275

(22) PCT Filed: Feb. 12, 2020

(86) PCT No.: PCT/EP2020/053564
§ 371 (c)(1),
(2) Date: Aug. 4, 2021

(87) PCT Pub. No.: WO2020/165229
PCT Pub. Date: Aug. 20, 2020

(65) Prior Publication Data
US 2022/0124554 A1 Apr. 21, 2022

(30) Foreign Application Priority Data
Feb. 14, 2019 (EP) .................................... 19157311

(51) Int. Cl.
*H04W 28/06* (2009.01)
*H04W 8/04* (2009.01)

(52) U.S. Cl.
CPC ............. *H04W 28/06* (2013.01); *H04W 8/04* (2013.01)

(58) Field of Classification Search
None
See application file for complete search history.

(56) References Cited

U.S. PATENT DOCUMENTS 6,542,504 B1 * 4/2003 Mahler .................. H04L 69/04 370/392
7,948,913 B1 * 5/2011 Dinan .................. H04L 1/0026 370/252

(Continued)

FOREIGN PATENT DOCUMENTS

WO 2011/020108 A2 2/2011

OTHER PUBLICATIONS

International Search Report and Written Opinion mailed on Jun. 9, 2020, received for PCT Application PCT/EP2020/053564, Filed on Feb. 12, 2020, 11 pages.

(Continued)

*Primary Examiner* — Suk Jin Kang
(74) *Attorney, Agent, or Firm* — XSENSUS, LLP

(57) ABSTRACT

A method of processing data for transmission in a wireless communications system, the method comprising identifying within the data a data frame having a protocol header, the protocol header comprising a plurality of protocol header fields and associated with a medium access control (MAC) frame format for data transmission within a local area network (LAN), determining a selected profile for header compression, the profile being selected from a plurality of predetermined profiles, each of the plurality of predetermined profiles specifying a subset of the protocol header fields, and applying compression to a subset of the protocol header fields in accordance with the selected profile to form a compressed data frame for transmission on a wireless access interface of the wireless communications network.

20 Claims, 9 Drawing Sheets

(56) References Cited

U.S. PATENT DOCUMENTS

| | | | | |
|---|---|---|---|---|
| 8,392,616 | B2 * | 3/2013 | Huang | H04L 1/0006 370/477 |
| 2007/0025387 | A1 * | 2/2007 | Zhang | H04L 69/161 370/447 |
| 2010/0091709 | A1 * | 4/2010 | Yi | H04W 28/065 370/477 |
| 2010/0302997 | A1 * | 12/2010 | Park | H04L 49/90 370/315 |
| 2011/0020108 | A1 | 1/2011 | Axelsson et al. | |
| 2011/0158166 | A1 * | 6/2011 | Lee | H04L 69/04 370/328 |
| 2013/0315209 | A1 * | 11/2013 | Murakami | H04L 69/22 370/331 |
| 2014/0211813 | A1 * | 7/2014 | Gochi Garcia | H04L 67/02 370/477 |
| 2014/0247772 | A1 * | 9/2014 | Wu | H04W 28/065 370/328 |
| 2015/0049678 | A1 * | 2/2015 | Speight | H04W 72/23 370/329 |
| 2015/0117460 | A1 * | 4/2015 | Persson | H04L 69/22 370/392 |
| 2016/0241685 | A1 * | 8/2016 | Shah | H04L 69/04 |
| 2017/0201603 | A1 * | 7/2017 | Uchino | H04W 36/04 |
| 2017/0257796 | A1 * | 9/2017 | Hsu | H04W 28/06 |
| 2017/0367047 | A1 * | 12/2017 | Fujishiro | H04W 36/0069 |
| 2019/0116521 | A1 * | 4/2019 | Qiao | H04W 28/06 |
| 2019/0200257 | A1 * | 6/2019 | Yang | H04L 1/1893 |
| 2020/0022021 | A1 * | 1/2020 | Yoon | H04W 24/04 |
| 2020/0236591 | A1 * | 7/2020 | Yi | H04L 67/12 |
| 2020/0244921 | A1 * | 7/2020 | Kwon | H04L 65/65 |
| 2020/0252484 | A1 * | 8/2020 | Cheng | H04L 65/762 |
| 2020/0322463 | A1 * | 10/2020 | Kwon | H04N 21/4345 |
| 2020/0374752 | A1 * | 11/2020 | Xiao | H04W 76/15 |
| 2021/0014721 | A1 * | 1/2021 | Youn | H04W 28/24 |
| 2021/0195463 | A1 * | 6/2021 | Zhang | H04W 28/06 |
| 2021/0258828 | A1 * | 8/2021 | Qiao | H04L 69/04 |
| 2021/0297861 | A1 * | 9/2021 | Nakarmi | H04W 12/03 |
| 2021/0314815 | A1 * | 10/2021 | Gangakhedkar | H04L 69/04 |
| 2021/0345171 | A1 * | 11/2021 | Yi | H04W 28/06 |
| 2021/0345181 | A1 * | 11/2021 | Shikari | H04W 24/04 |
| 2022/0038951 | A1 * | 2/2022 | Jo | H04W 28/06 |
| 2022/0132386 | A1 * | 4/2022 | Park | H04W 36/12 |
| 2022/0159107 | A1 * | 5/2022 | Kwon | H04L 47/36 |
| 2022/0166854 | A1 * | 5/2022 | Fan | H04L 69/04 |
| 2022/0338084 | A1 * | 10/2022 | Ryu | H04W 36/14 |
| 2022/0345284 | A1 * | 10/2022 | Kim | H04W 72/20 |
| 2023/0078783 | A1 * | 3/2023 | Qiao | H04L 69/04 |
| 2023/0132427 | A1 * | 5/2023 | Mochizuki | H04W 36/0069 370/329 |
| 2023/0284217 | A1 * | 9/2023 | Pelletier | H04W 76/18 370/329 |
| 2025/0048179 | A1 * | 2/2025 | Qiao | H04L 69/04 |

OTHER PUBLICATIONS

CMCC, "Consideration on Ethernet Header Compression", 3GPP TSG-RAN WG2 #104, R2-181812, Nov. 12-16, 2018, 4 pages.

3GPP, "NR; Radio Resource Control (RRC) Protocol Specification (Release 15)", 3GPP TS 38.331 V15.3.0, Sep. 2018, pp. 1-445.

3GPP, "NR; NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA Based Radio Access", John Wiley and Sons, 2009, pp. 25-27.

3GPP, "NR; NR and NG-RAN Overall Description; Stage 2 (Release 15)", 3GPP TS 38.300 V15.4.0, Dec. 2018, pp. 1-97.

Nokia et al., "Revised SID: Study on NR Industrial Internet of Things (IoT)", 3GPP TSG RAN meeting #81, RP-182090, Sep. 10-13, 2018, 5 pages.

Huawei et al., "New SID on Physical Layer Enhancements for NR Ultra-Reliable and Low Latency Communication (URLLC)" 3GPP TSG-RAN#81, RP-182089, Sep. 10-13, 2018, 5 pages.

3GPP, "NR; Packet Data Convergence Protocol (PDCP) Specification (Release 15)", 3GPP TS 38.323 V15.1.0, Mar. 2018, pp. 1-25.

* cited by examiner

HEADER COMPRESSION ADAPTIVE TO QUALITY OF RADIO CHANNEL

CROSS-REFERENCE TO RELATED APPLICATIONS

The present application is based on PCT filing PCT/EP2020/053564, filed Feb. 12, 2020, which claims priority to EP 19157311.2, filed Feb. 14, 2019, the entire contents of each are incorporated herein by reference.

BACKGROUND

Field

The present disclosure relates to communications devices, infrastructure equipment and methods for the compression and decompression of data in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
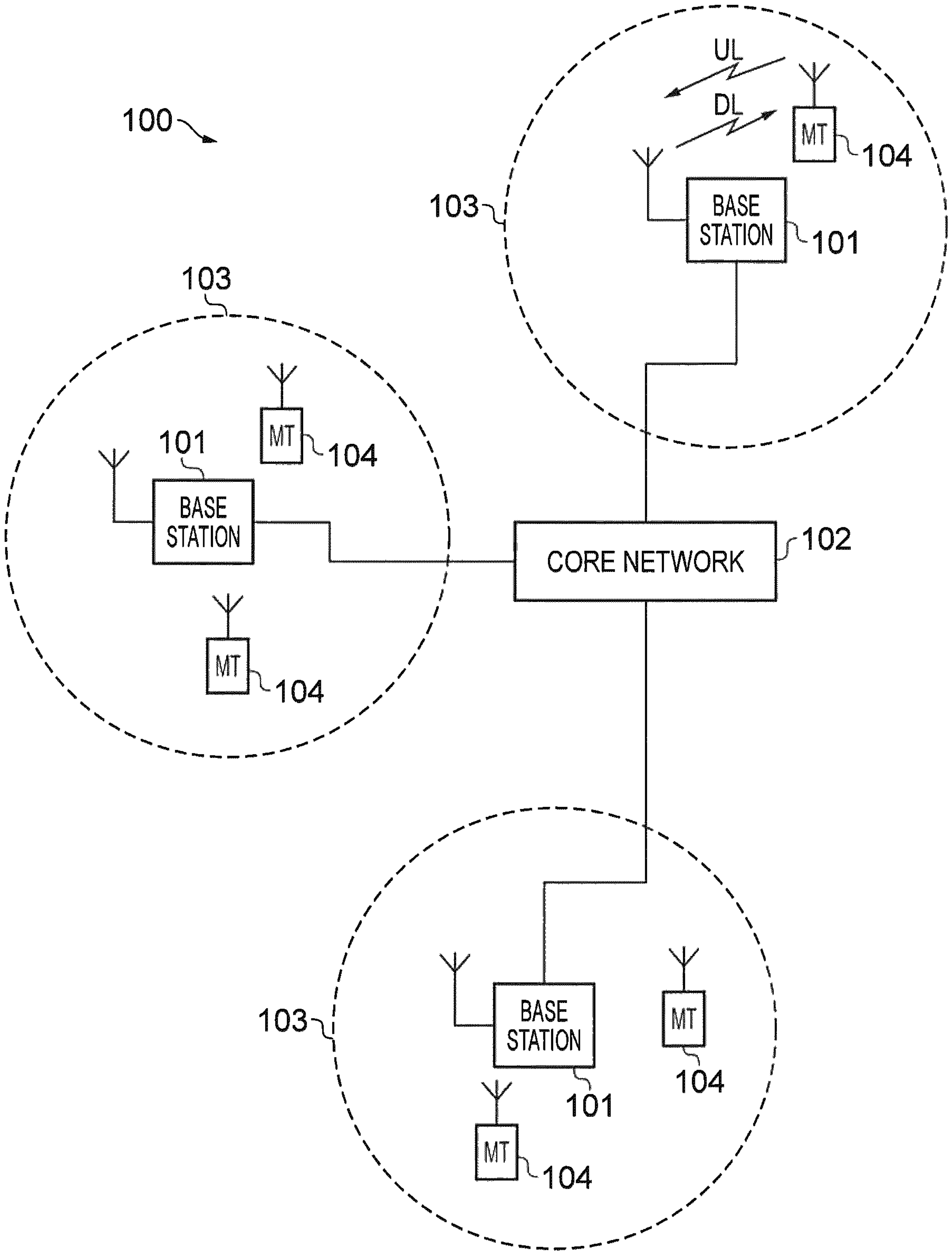
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
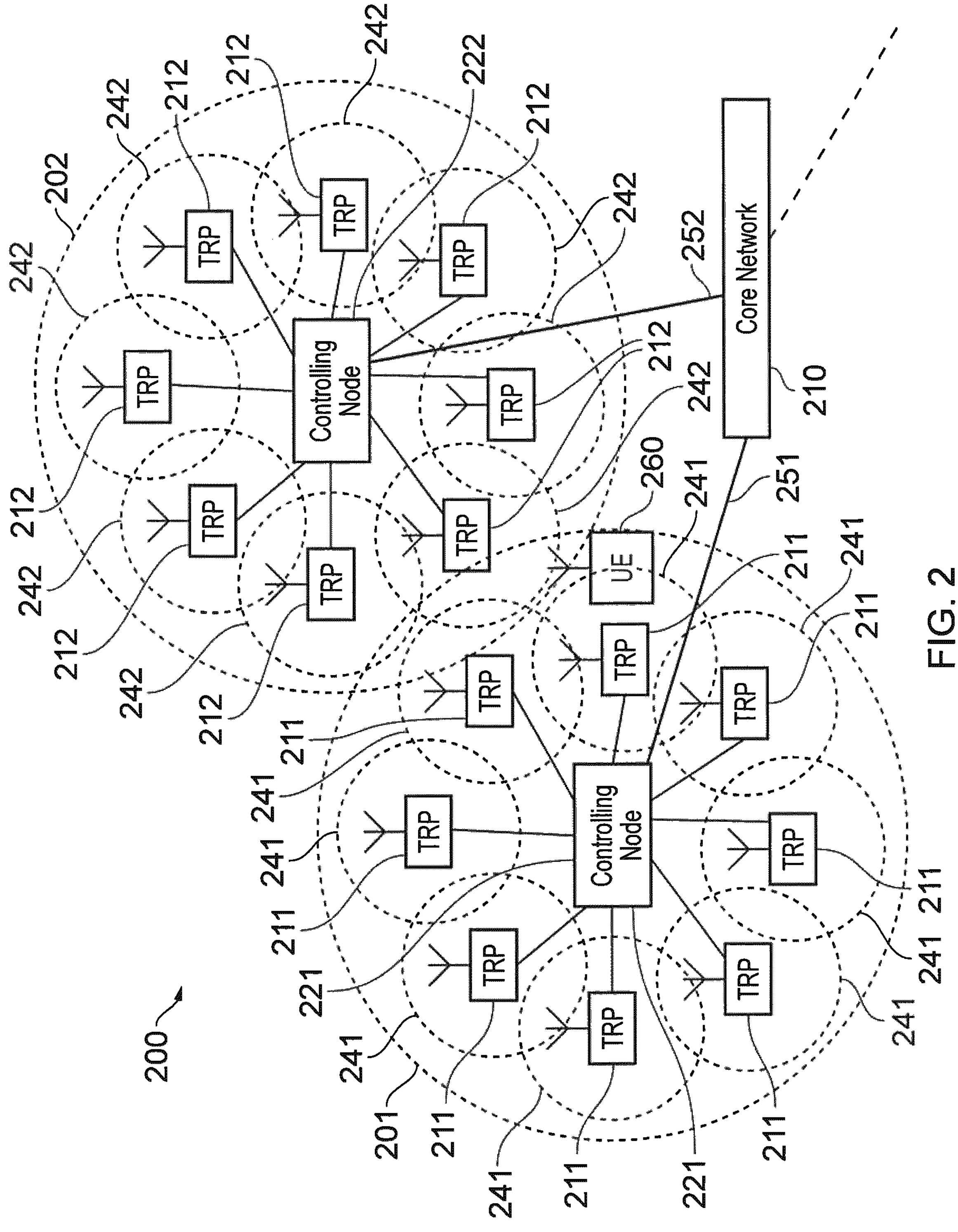
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
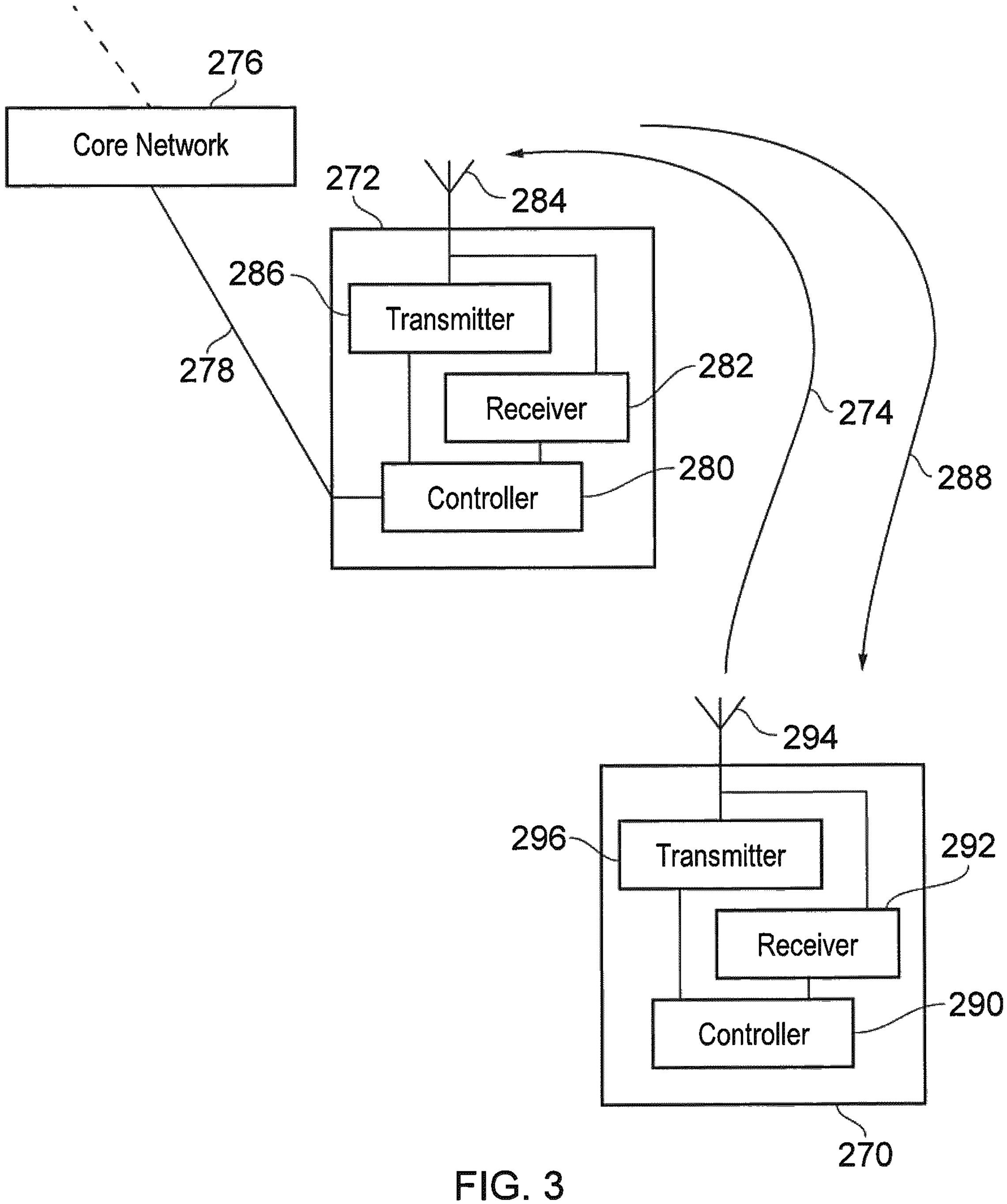
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 via grant free resources of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Conventionally, a wireless telecommunications network interfaces with external networks at the internet protocol (IP) layer. That is, a gateway of the wireless communications network receives IP packets in which the intended recipient communications device is identified by one or more destination address fields (such as IP destination address and/or port number). Similarly, outbound data is formed into IP packets, in which the source communications device is identified by a source IP address and/or source port number. (Note that this may be the case even if techniques such as network address translation are used, whereby the gateway or other entity modifies these addresses so that the address fields on inbound and/or outbound packets are modified at the logical boundary of the wireless communications network).

It will be appreciated that lower layer protocols may be used both within the wireless communications network, and externally to it, such as on links terminating at the gateway. However, headers associated with these protocols may conventionally be discarded before the encapsulated IP packet is forwarded.

Conventionally, wireless communications network have compressed the internet protocol (IP) header when the IP packet is transmitted over a wireless access interface by exploiting redundancy between the headers of sequential IP packets. In order to ensure that the IP header compressor at the transmitter and IP header decompressor at the receiver remain synchronized, the full header is transmitted, uncompressed, at regular intervals. Thus, it is possible for the receiver to reconstruct the original (uncompressed) IP header before forwarding the IP packet or passing it to higher layers in the protocol stack. Header compression can be lossless and may result in significantly improved efficiency in the use of communications resources on the wireless access interface.

Recently, there has been some interest in permitting interfacing of a wireless telecommunications network at a lower protocol layer. In particular, a gateway of the wireless telecommunications network may receive data frames formatted according to the Institute of Electrical and Electronic Engineers (IEEE) 802.3 frame format, or according to the Ethernet frame format, and may convey such frames internally within the wireless communications network, such that the complete Ethernet frame received at the gateway is made available to the end recipient. Similarly, a communications device may be able to construct a frame in accordance with such specifications for transmission outside of the wireless communications network.

It will be appreciated that the frame formats for IEEE 802.3 and for Ethernet are very similar, to the extent that their differences may be immaterial to the presently disclosed techniques, and thus the terms are used interchangeably within the present disclosure.

Figure 4:
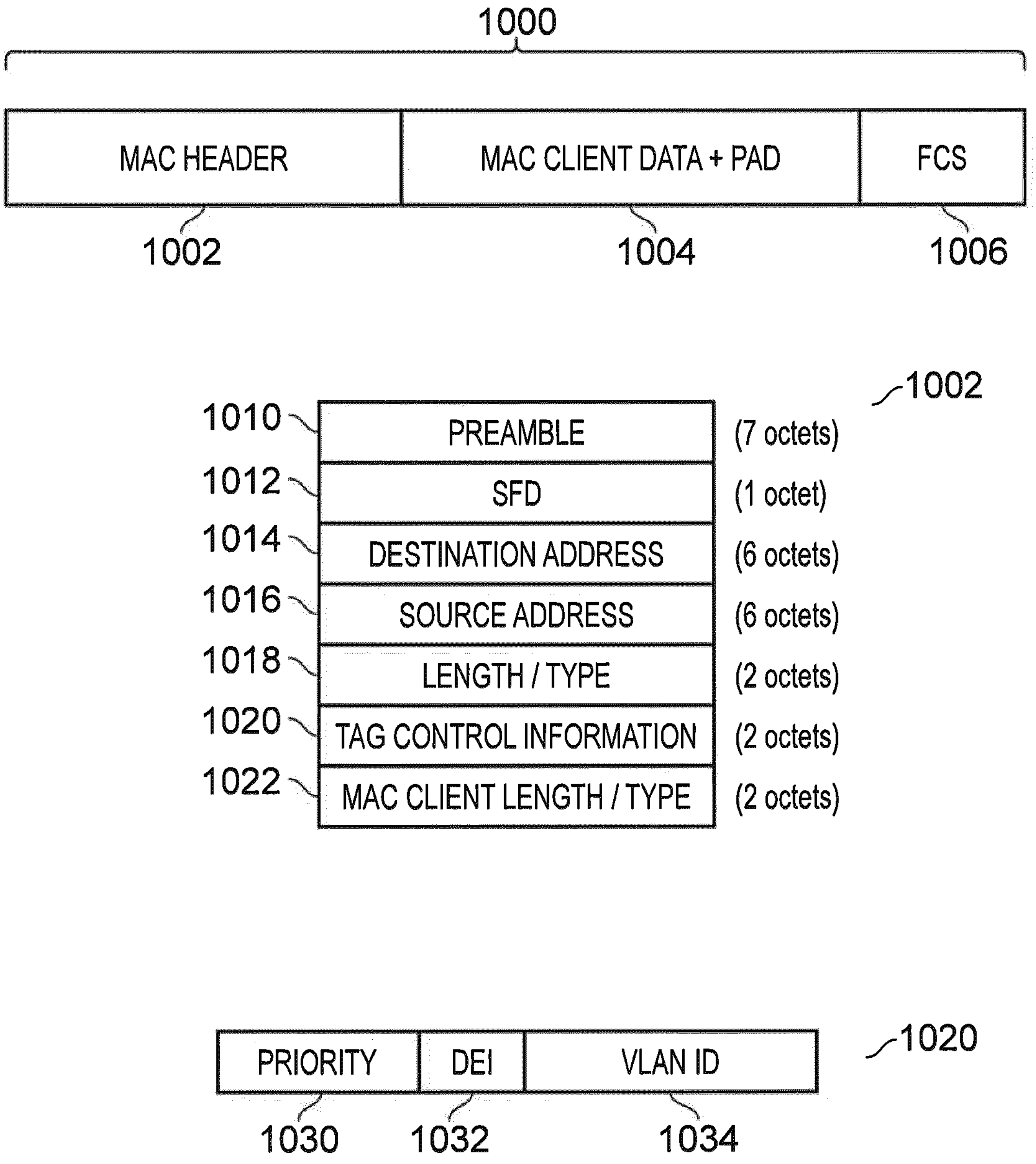
FIG. 4 illustrates an IEEE 802.3 medium access control (MAC) frame format, in accordance with the IEEE 802.1Q (2014) specification.

FIG. 4 illustrates an IEEE 802.3 MAC frame format, in accordance with the IEEE 802.1Q (2014) specification.

The IEEE 802.3 MAC frame 1000 comprises a MAC header 1002, MAC Client data and padding 1004, and a frame check sequence (FCS) 1006. The MAC header 1002 comprises a preamble 1010 and a start frame delimiter (SFD) 1012 of length 7 octets and 1 octet respectively. There then follows a destination address field 1014, and a source address field 1016, each of 6 octets.

The MAC header 1002 also comprises a Length/Type field 1018 and a Tag Control information field 1020, each of two octets. Collectively, the Length/Type field 1018 and Tag Control information field 1020 may be referred to as a Q Tag Prefix.

The MAC header 1002 also comprises a MAC client length/type field 1022 of two octets, which may comprise a pre-determined value to indicate that the Tag Control information field 1020 is present.

The Tag Control information field 1020 may comprise a priority indication field 1030 of 3 bits, a drop eligible indicator (DEI) bit 1032, and a virtual local area network (VLAN) identifier field 1034 of 12 bits.

In some embodiments, for example where the IEEE 802.1Q (2014) specification is not applicable, the MAC header 1002 may not contain the Tag Control information field 1020.

Figure 5:
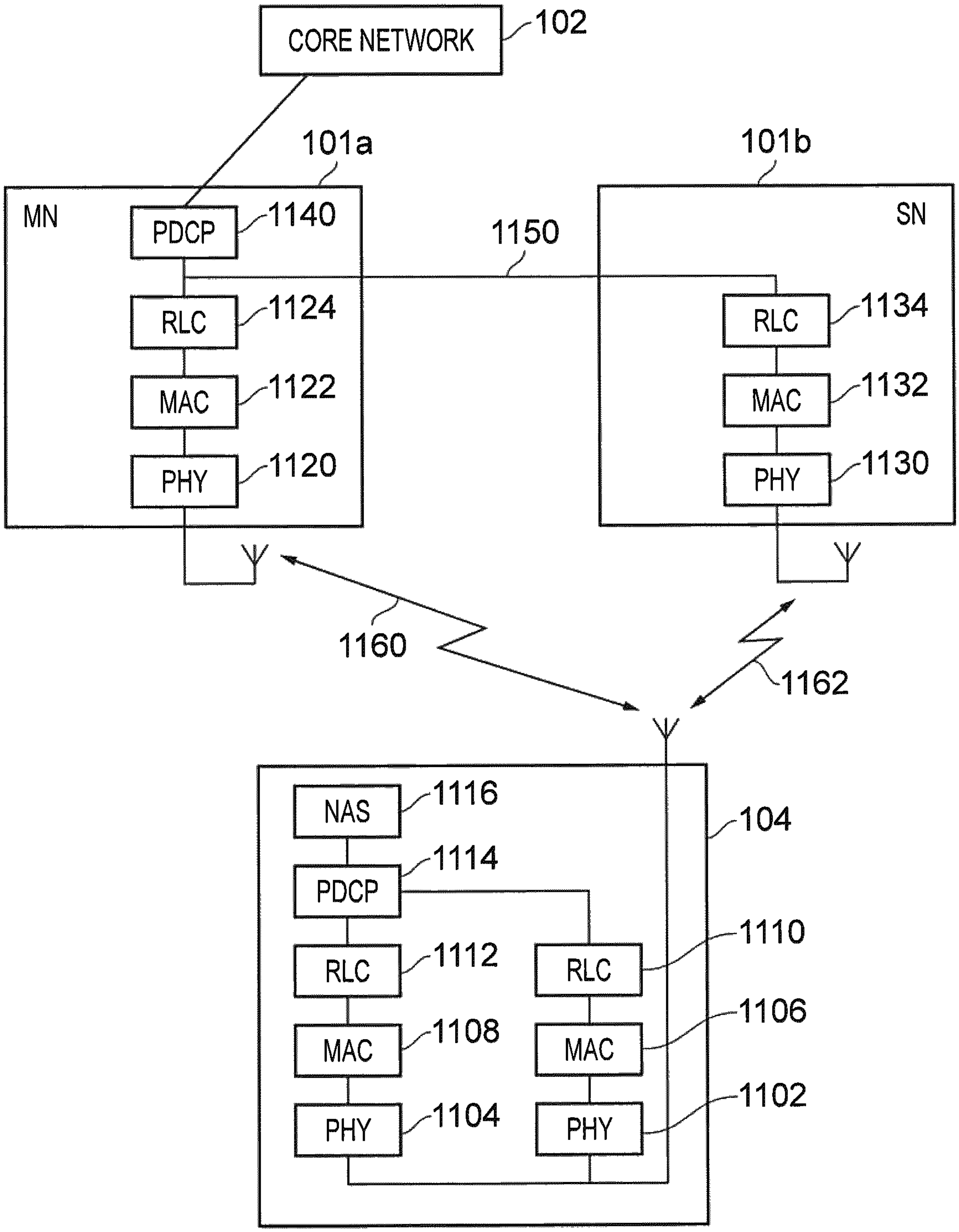
FIG. 5 is a block diagram showing protocol entities within a communications device and infrastructure equipment which may be configured to operate in accordance with example embodiments.

FIG. 5 is a block diagram showing logical protocol entities within a communications device 104 and two infrastructure equipment 101*a*, 101*b* which may be configured to operate in accordance with example embodiments of the present technique. The communications device 104 may broadly correspond to the communications device 270 illustrated in FIG. 3 and described above. Each of the infrastructure equipment 101*a*, 101*b* may broadly correspond to the infrastructure equipment 272 illustrated in FIG. 3 and described above.

Protocol entities may be characterised by functions which they provide to other protocol entities. For example, physical layer (PHY) protocol entities 1102, 1104 may control the transmitter 296 and receiver 292 to transmit and receive signals representing data on the wireless access interface. The PHY protocol entities 1102, 1104 may thus provide an encoding and modulation function for data transmission, and a demodulation and decoding function for data reception.

The PHY protocol entities 1102, 1104 may provide these services to respective medium access control (MAC) protocol entities 1106, 1108, which in turn provides services to respective radio link control (RLC) protocol entities 1110, 1112. The RLC entities 1110, 1112 interact with a packet data convergence protocol (PDCP) entity 1114, which in turn receives data for transmission from, and passes received data to, a non-access stratum (NAS) layer 1116. The NAS layer may be an example of an 'upper layer', with respect to the access stratum (AS) layer comprising the PDCP protocol entities 1110, 1112 and lower layer protocol entities. In addition, an SDAP (Service Data Adaptation Protocol) protocol entity, not shown in FIG. 5 for conciseness, may reside on top of (i.e. at a higher logical layer than) the PDCP protocol entities 1110, 1112.

In some embodiments, the communications device 104 operates in single connectivity mode, whereby only one instance each of the RLC protocol entities 1112, 1110, MAC protocol entities 1108, 1106 and PHY protocol entities 1104, 1102 are active; for example, only the RLC entity 1112, MAC protocol entity 1108 and PHY protocol entity 1104 are active. Data may be communicated between the communications device 104 and the infrastructure equipment 101*a* via a first wireless access interface 1160.

In some embodiments of the present technique, the communications device 104 shown in FIG. 5 may be configured to act in a dual connectivity (DC) mode of operation, in which data may be communicated between the communications device and first and second infrastructure equipment 101*a*, 101*b* substantially simultaneously. The first infrastructure equipment 101*a* may act as a master node (MN) and the second infrastructure equipment 101*b* may act as a secondary node (SN). In the DC mode, each of the infrastructure equipment 101*a*, 101*b* has an RLC entity 1124, 1134 which has as a peer one of the RLC entities 1110, 1112 of the communications device 104 per radio bearer. Accordingly, each of the infrastructure equipment 101*a*, 101*b* has a MAC protocol entity 1122, 1132, being the peer of the corresponding MAC entity 1106, 1108 of the communications device 104, and a PHY entity 1120, 1130 being a peer of the corresponding PHY entity 1102, 1104 of the communications device 104.

Thus, unlike in the single connectivity mode, in dual connectivity in the communications devices 104 two sets of RLC, MAC and PHY protocol instances are active, for the communication of data directly with the MN 101*a* via the first wireless access interface 1160 and via the SN 101*b* via a second wireless access 1162 for a single radio bearer.

In both dual connectivity and single connectivity mode, at the PDCP protocol layer, the single PDCP entity 1114 of the communications device 104 has as its peer a single PDCP entity 1140 of the master node 101*a*.

In dual connectivity, the PDCP entity 1140 of the MN 101*a* interacts with both the RLC entity 1124 of the MN 101*a* and the RLC entity 1134 of the SN 101*b* via an inter-radio access network node interface 1150, which may be an Xn or X2 interface.

Each protocol entity in the communications device 104 may be implemented by the controller 290 in combination with the receiver 292 and transmitter 270 of the communications device.

Similarly, each protocol entity in the infrastructure equipment 101*a*, 101*b*, may be implemented by the respective controller 280 in combination with the respective receiver 282 and transmitter 286 of the infrastructure equipment.

In order to improve reliability of transmission of data between the communications device 104 and the wireless communications network, each of the PDCP entities 1140, 1114 may conventionally provide duplication functionality for transmitted data, so that data received from upper layers may be transmitted both via the MN 101*a* and via the SN 101*b*. Similarly, each of the PDCP entities 1140, 1114 may provide de-duplication functionality to ensure that only a single instance of the upper layer data is passed to the upper layers (for downlink data) or forwarded to the core network 102 (for uplink data).

The use of header compression in combination with duplication at the PDCP layer may provide high transmission reliability while making efficient use of radio resources.

The inventors of the present disclosure have nevertheless identified a need to provide improved techniques for the reliable of data transmitted using header compression techniques, while making efficient use of radio resources, in particular for the transmission of Ethernet frames.

Thus, there is provided a method of processing data for transmission in a wireless communications system, the method comprising identifying within the data a data frame having a protocol header, the protocol header comprising a plurality of protocol header fields and associated with a medium access control (MAC) frame format for data transmission within a local area network (LAN), determining a selected profile for header compression, the profile being selected from a plurality of predetermined profiles, each of the plurality of predetermined profiles specifying a subset of the protocol header fields, and applying compression to a subset of the protocol header fields in accordance with the selected profile to form a compressed data frame for transmission on a wireless access interface of the wireless communications network.

There is further provided A method of processing data transmitted in a wireless communications system, the method comprising identifying within the data a compressed data frame comprising protocol header fields, determining a selected profile for header compression, the profile being selected from a plurality of predetermined profiles, each of the plurality of predetermined profiles specifying a subset of protocol header fields, and applying decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Conventionally, where duplication is enabled together with IP header compression, the duplication is performed (by the PDCP entity) after the IP header compression. As such, the same (compressed) IP header information is sent on both 'legs' (i.e. via the SN, and direct from the MN to the communications device).

However, the radio channels are error prone and, although duplication may allow the transmission of multiple copies of packets, there remains a possibility that one or both instances of the data are corrupted and/or that the compressor and decompressor are out of sync with regards to the compression algorithm so that header decompression may fail.

In accordance with embodiments of the present technique, there are provided techniques to allow a selection of a profile specifying a subset (or all, or none) of the Ethernet header fields to be compressed, from a plurality of profiles. Thus, the appropriate profile may be selected in order to provide reliable data transmission while making efficient use of radio resources.

There are further provided in some embodiments techniques in which a different compression profile is applied to data frames which are to be transmitted using different 'legs', i.e. where the transmitter-receiver pair on the wireless access interface is different. Appropriate profiles may be selected jointly for each leg, to provide reliable data transmission while making efficient use of radio resources. In such embodiments, a single PDCP entity in the wireless communications network may be peered with a corresponding PDCP entity in the communications device, to avoid additional complexity of multiple PDCP protocol entities. In some such embodiments, the data frames are duplicated and the duplicate copies are compressed independently of each other, i.e. using potentially different compression profiles.

According to embodiments of the present technique, compression and decompression of the Ethernet frame header is carried out in accordance with a selected profile, the selected profile identifying zero, one, or more Ethernet header fields which are to be subject to compression.

In some embodiments, the selected profile is selected from a plurality of predetermined profiles. In some embodiments, the selected profile is selected from three or more predetermined profiles, wherein a first predetermined profile specifies that no header fields are to be compressed, a second predetermined profile specifies that a first plurality of header fields are to be compressed, and the third profile specifies that a second plurality of header fields are to be compressed, the second plurality being a subset of the first plurality of header fields and containing fewer fields than the first plurality.

In some embodiments, each profile is associated with a profile identifier (Profile ID).

In some embodiments, one of more of the predetermined profiles may specify fields as shown in Table 1, for the case where 802.1Q is applied.

TABLE 1

| Profile | Compressed fields |
|---|---|
| 0x0000 | None |
| 0x0001 | Destination Address, Source Address |
| 0x0002 | Destination Address, Source Address, QTag prefix excluding VLAN ID |
| 0x0003 | Destination Address, Source Address, QTag prefix excluding QoS information such as priority code point (PCP) and/or drop eligible (DE) indicator |
| 0x0004 | Destination Address, Source Address, QTag prefix |

In some embodiments, where 802.1Q is not applied, each predetermined profile may specify whether or not the length/type field (or portion(s) thereof) is to be compressed. In some embodiments, the predetermined profiles may comprise a profile in which no header fields are compressed, a profile in which a plurality of header fields are compressed, and a further profile in which a subset of the plurality of header fields are compressed; for example, the predetermined profiles may correspond to those associated with the profile IDs 0x0000, 0x0004, and 0x0002.

In some embodiments, the compression is carried out at a PDCP protocol entity.

Embodiments in which a predetermined profile specifies one or more header fields, excluding the length/type and/or QTag prefix, may permit a protocol entity at a lower protocol layer than that at which the compression is applied to apply appropriate prioritisation, scheduling and/or encoding, based on a mapping between an (uncompressed) field in the Ethernet header and a rule for such prioritisation, scheduling and/or encoding. For example, there may be established a mapping between a particular radio bearer on the wireless access interface and a value of an Ethernet header field. By refraining from compressing that Ethernet header field at a higher layer, a mapping of the Ethernet frame to the particular radio bearer may be carried out at a lower layer, and the frame may accordingly be transmitted using the radio bearer.

For example, embodiments in which a predetermined profile specifies one or more header fields, excluding the VLAN ID, may permit a protocol entity at a lower protocol layer than that at which the compression is applied, such as a MAC protocol entity, to identify a service (such as the URLLC service) associated with the frame, where the VLAN ID is associated with the service. A service may be associated with particular quality of service requirements. By mapping an Ethernet frame to a service, a transmitting entity (such as the infrastructure equipment 101*a*, 101*b*)) can accordingly transmit the frame in accordance with the quality of service requirements associated with that service.

Embodiments in which a predetermined profile specifies both the destination address and the source address fields may provide efficient use of communications resources, since the destination and source addresses may not be relevant over the wireless access interface and may be recoverable at the receiver.

In some embodiments, the compression profile for communication of data between the communications device 104 and the first infrastructure equipment 101*a* is selected by the infrastructure equipment, such as the first infrastructure equipment 101*a*.

The selected profile may be indicated to the communications device 104 by means of RRC configuration, by MAC layer signalling, or in layer 1 signalling.

In some embodiments, the selected profile may be modified by the infrastructure equipment 101*a* during an ongoing connection. The modified profile may be indicated to the communications device 104 by means of RRC configuration, by MAC layer signalling, or in layer 1 signalling.

In some embodiments, the infrastructure equipment 101*a* comprises a compressor as described herein, and the communications device 104 comprises a decompressor as described herein. Additionally or alternatively, in some embodiments, the infrastructure equipment 101*a* comprises a decompressor as described herein, and the communications device 104 comprises a compressor as described herein.

In some embodiments, the infrastructure equipment 101*a* may change which profile is selected based on one or both of feedback of radio conditions and feedback regarding a success/failure of decompressor. Feedback on the radio conditions may comprise measurement reports transmitted by the communications device 104 to the infrastructure equipment 101*a*. Similarly, feedback regarding a success or failure of a decompressor may comprise an indication of whether one or more previous decompression attempts has been successful or has failed. The radio conditions may comprise a quality measurement associated with a radio channel of the wireless access interface. The quality measurement may comprise a signal to noise ratio, a received signal strength or an indicator based on such a ratio or strength.

In some embodiments, an indication of success/failure of the decompressor in respect of one or more downlink (respectively uplink) frames is indicated in a PDCP header associated with an uplink (respectively downlink) frame.

Modifying the selected profile in response to channel conditions and/or decompressor success or failure may result in more efficient use of the resources of the wireless access interface.

In some embodiments, a given connection (e.g. associated with a PDU session) may be associated with a subset of the predetermined plurality of profiles. For example, a PDU session may be associated with only the profiles 0x0000, 0x0002 and 0x0004 of Table 1.

In some embodiments, where no duplication is used for the Ethernet frames, security (i.e. one or both of ciphering and integrity) may be activated. That is, encryption may be applied and/or an integrity protection field may be added after the compression of the Ethernet header.

Figure 6:
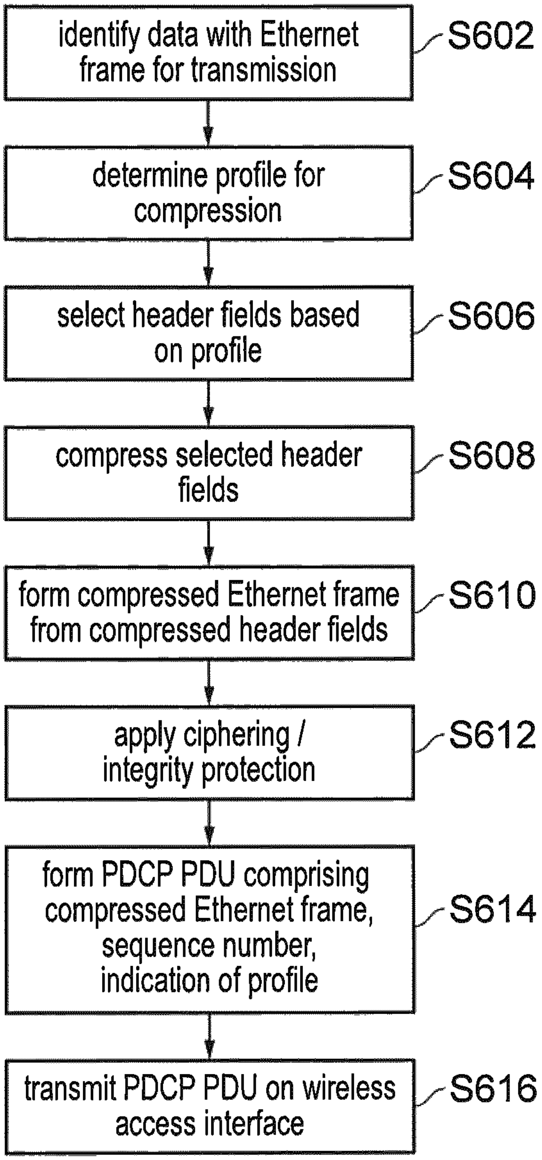
FIG. 6 illustrates a flowchart for a process of compressing frames in accordance with embodiments of the present technique.

FIG. 6 illustrates a flowchart for a process of compressing frames in accordance with embodiments of the present technique.

The process starts at step S602 in which it is identified that data comprising an Ethernet frame is available for transmission. The data may have been received from upper protocol layers within the same entity, for example from a NAS protocol entity, or the data may have been received from another entity of the wireless communications network, for example the core network entity 102.

Figure 7:
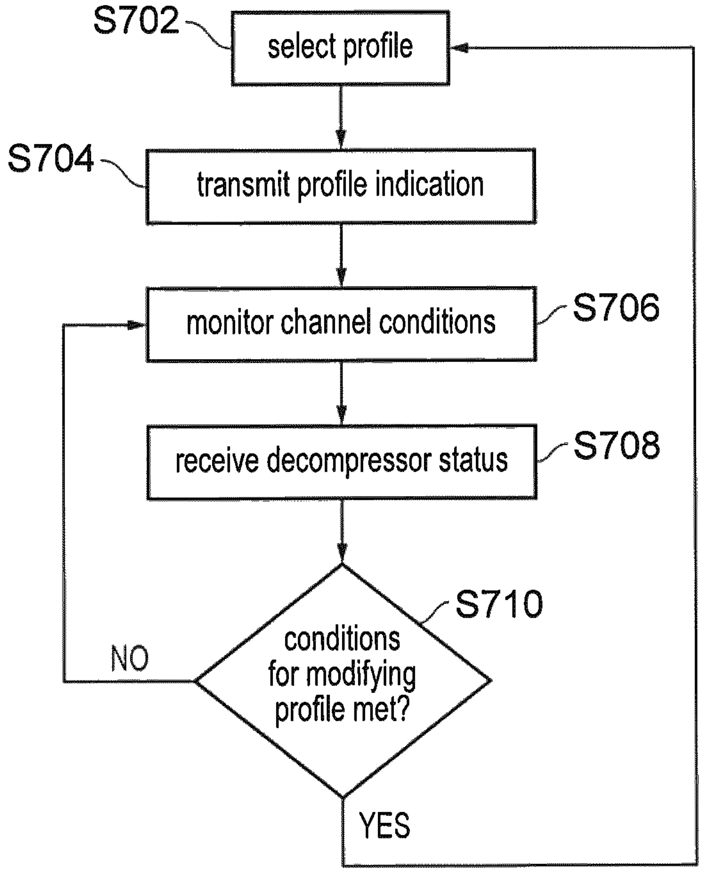
FIG. 7 illustrates a process in accordance with embodiments of the present technique for selecting a profile for the compression of Ethernet frames.

At step S604, it is determined which profile is to be used for compression. As described elsewhere the profile may indicate which subset of header fields are to be compressed. The profile may be determined based on an indication received from a peer entity, such as an infrastructure equipment of the wireless communications network. Alternatively the profile may be determined in accordance with a process for determining a profile that is illustrated in FIG. 7 and described below.

At step S606 header fields are selected based on the profile determined at step S604. Each profile may be identified by a corresponding profile identifier, which corresponds to a subset of the Ethernet frame header fields which are to be compressed. An example of profiles and their corresponding identifiers is shown above in Table 1. For example, where the selected profile is the profile having the identifier 0x0001, then the selected fields comprise the destination address field 1014, the source address field 1016, the length/type field 1018 and portions of the tag control information field 1020. However according to the profile 0x0001, the VLAN ID 1034 is not one of the selected header fields and therefore will not be compressed.

At step S608, the selected header fields are compressed. The compression may be in accordance with conventional header compression techniques, such as those conventionally applied to IP headers. These may include state based compression techniques wherein the result of the compression depends on not only the contents of the selected header fields of the present Ethernet frame, but also on the contents of one or more previous Ethernet frames which have been compressed. It is important to note that depending on the selected profile some header fields may not be compressed. As described above for example where the selected profile has the identifier 0x0001, then the VLAN ID field is not compressed. By refraining from compressing certain header fields, these fields may be made available, uncompressed, to lower protocol layers which may use the contents of the uncompressed fields for their own purposes for example a medium access control (MAC) protocol entity may use the VLAN ID field to select two identifying quality of service requirements associated with the Ethernet frame. Hence the Ethernet frame may be scheduled appropriately for transmission on a wireless access interface.

Subsequently, at step S610, a compressed Ethernet frame is formed using the compressed header fields, the uncompressed header fields and the uncompressed MAC data 1004. Optionally at step S612, ciphering and/or integrity protection may be applied to the compressed Ethernet frame.

At step S614, a PDCP PDU is formed comprising the compressed Ethernet frame which may be ciphered and/or integrity protected and a sequence number. In some embodiments, the PDCP PDU may comprise an indication of the profile used for the compression as determined at step S604.

At step S616, the PDCP PDU is transmitted on a wireless access interface.

Steps S602 to S616 may be carried out by a PDCP protocol entity such as the PDCP entity 1140 of the first infrastructure equipment 101*a*, or the PDCP entity 1114 of the communications device 101.

It will be appreciated that, in accordance with conventional techniques, the PDCP PDU may be further processed by protocol entities at lower layers such as the RLC protocol entity 1124, 1110, the MAC protocol entity 1122, 1108 and the PHY protocol entity 1120, 1104 before being transmitted as signals over the wireless access interface.

FIG. 7 illustrates a process in accordance with embodiments of the present technique, by which a profile for the compression of Ethernet frames may be selected. The process of FIG. 7 may be carried out for example by the infrastructure equipment 101*a*. The process of FIG. 7 may be initiated in response to a determination that a PDU session having a type corresponding to Ethernet frames is to be established for the communications device 101 in the wireless communications network.

The process starts at step S702, in which initially a profile is selected based on predetermined rules, for example based on a default compression profile. Subsequently at step S704, an indication of the selected profile is transmitted to the communications device 101.

At step S706, the channel conditions applicable to transmissions of the wireless access interface between the infrastructure equipment and the communications device are determined. This may comprise, for example, measurements of signals received from the communications device 104, or receiving results of measurements performed by the communications device 104 of downlink signals.

The process continues with step S708, in which the infrastructure equipment 101*a* receives from the communications device 104 an indication of a status of an Ethernet frame decompressor. The decompressor status may indicate whether or not the communications device 104 has been successful in decompressing previously transmitted compressed Ethernet frames.

Subsequently at step S710, the infrastructure equipment 101*a* determines whether or not conditions for modifying the selected compression profile are met. If they are not, then control passes to step S706. If the conditions are met at step S710, then control returns to step S702, in which the selected profile is modified based on one or both of the monitored channel conditions and the received indication of the decompressor status.

For example, where channel conditions are determined to have deteriorated at step S706, then the new selected profile may be one which compresses fewer Ethernet header fields, or possible no Ethernet header fields. Conversely, for example, if the received decompressor status indicates that a high proportion of previously received Ethernet frames have been decompressed successfully by the communications device, then the new selected profile may correspond to a profile in which more Ethernet header frames are compressed.

The process then continues with step S704 and the process may generally continue while the PDU session is ongoing.

In some embodiments, one or more of steps S708 and S706 may be omitted, and the conditions for modifying the selected profile modified accordingly.

In some embodiments, a determination to modify the selected profile may be based at least in part on a number of frames that have been sent consecutively using the currently selected profile. The determination may be further based on the currently selected profile. For example, in some embodiments, if 10 frames have been sent in accordance with a particular profile, according to which one or more header frames are compressed, then a next two frames may be transmitted using a different profile, before switching back to the previous profile. In some such embodiments, according to the different profile, no header frames are compressed.

As such, there may be transmitted sequences of frames, comprising ten frames having some or all header fields compressed, followed by two frames having no header compression applied, and so on.

In some embodiments, the process of FIG. 7 may be applied when the data communication is by means of dual connectivity. As will be described below, in some embodiments, a different profile may be configured for each 'leg' of the dual connectivity and thus in step S702 two profiles may be selected, one for each leg of the dual connectivity. Accordingly, steps S704, S708 and S710 may be carried out in respect of each leg independently, or both legs jointly.

Figure 8:
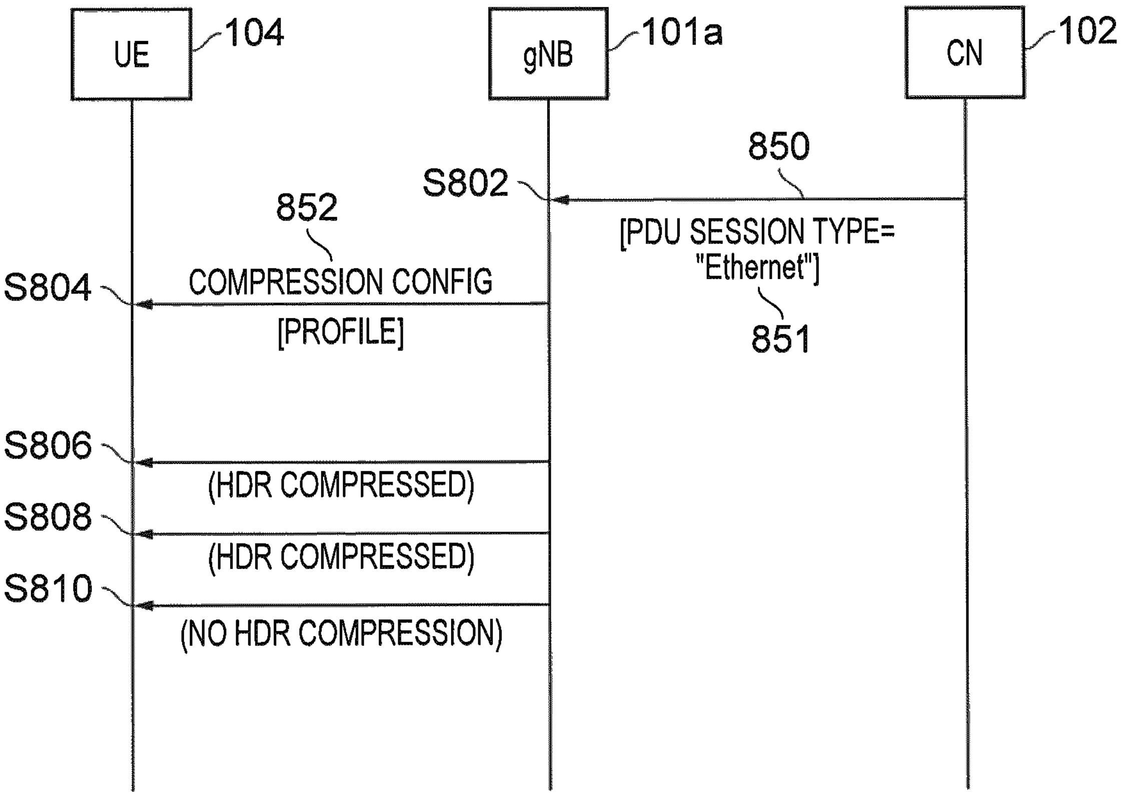
FIG. 8 illustrates a message sequence chart in accordance with some embodiments of the present technique.

FIG. 8 illustrates a message sequence chart in accordance with some embodiments of the present technique.

The process illustrated in FIG. 8 starts at step S802 in which the core network part 102 transmits an PDU session setup indication 850 to the gNodeB 101*a*. The PDU session setup indication 850 transmitted by the core network part 102 at step S802 may comprise a PDU session type indicator 851 which indicates that the PDU session to be set up is of an Ethernet type.

In response to receiving the PDU session setup indication 850, the gNodeB 101 may transmit, at step S804, a compression configuration indication 852 indicating of one or more compression profiles for the compression of the Ethernet frame headers. In some embodiments the compression configuration indication 852 is transmitted as part of RRC configuration, or is transmitted at the MAC layer, or may be indicated by means of layer 1 signalling. The compression configuration indicator 852 may indicate one or more profile numbers, which may correspond to predetermined profiles as previously described.

Subsequently the communications device 104 and the gNodeB 101 may communicate user data between them, in which the Ethernet headers may be compressed in accordance with the profile or profiles indicated by the compression configuration indicator 852. In some embodiments, even when Ethernet frame header compression is configured for one or more of the Ethernet frame header fields, some data may be sent with an uncompressed Ethernet frame header, in order to ensure that the compressor and decompressor remain synchronised.

For example user data transmitted at steps S806 and S808 may comprise a compressed Ethernet frame header, while user data transmitted subsequently at step S810 is transmitted without any compression being applied to the Ethernet header.

In some embodiments, duplication is applied to the data to provide increased reliability of transmission.

As shown in FIG. 5, duplication may be carried at the PDCP entity of a MN 101*a* and the two resulting instances may be transmitted over different radio channels by the MN 101*a* and the SN 101*b*. In the uplink, duplicate instances may be transmitted by the communications device 104 to the MN 101*a* and the SN 101*b*.

In some embodiments of the present technique, duplication occurs prior to header compression. Thus, in some embodiments, different header compression profiles may be applied to each copy of the Ethernet frame.

Figure 9:
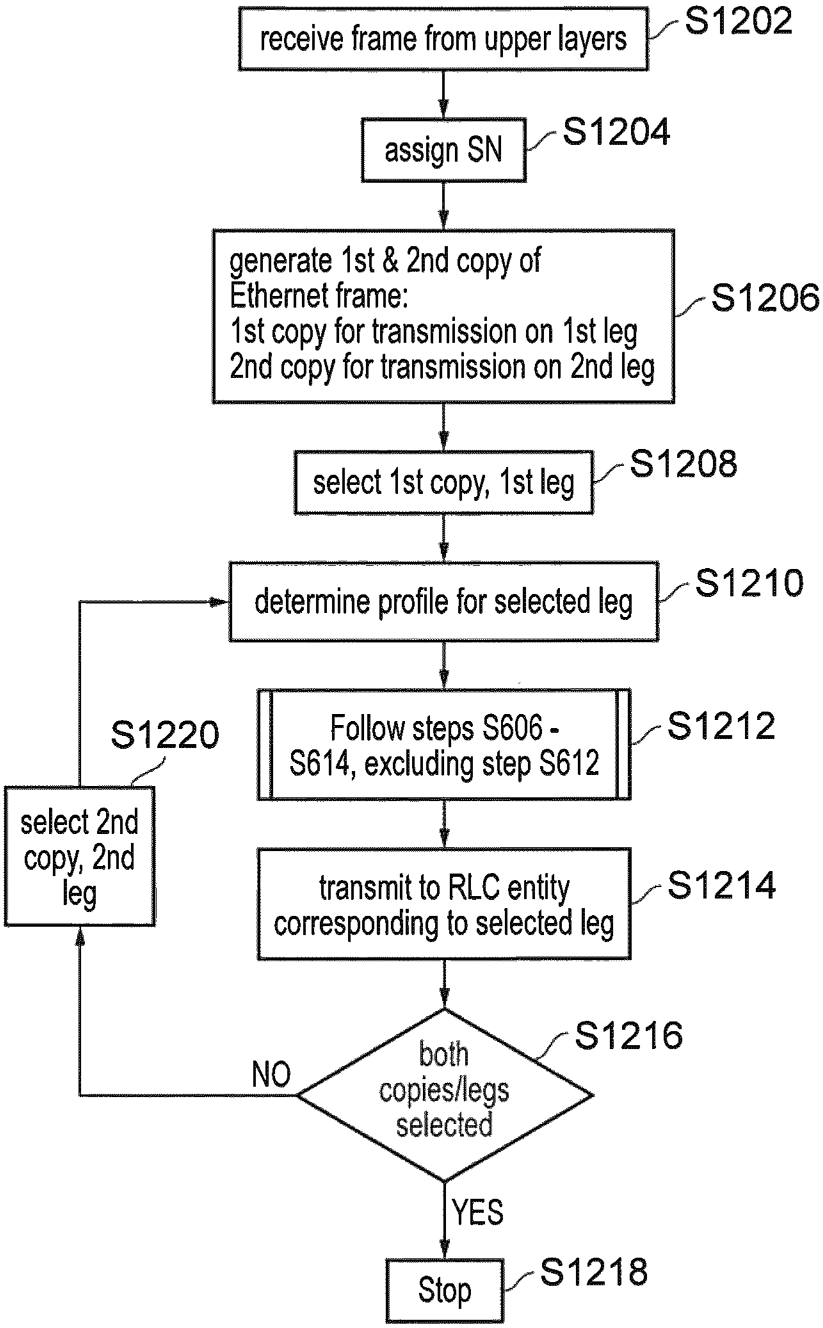
FIG. 9 shows a process for duplicating and compressing Ethernet frames for transmission which may be carried out by an infrastructure equipment or a communications device, in accordance with embodiments of the present technique.

FIG. 9 shows a process which may be carried out by the PDCP entity 1140 of the MN 101*a*, or the PDCP entity 1114 of the communications device 104.

The process starts at step S1202, in which data is received from upper layers for transmission; this may comprise receiving the data from the core network part 102 in the case of the MN 101*a*.

The Ethernet frame is identified and a sequence number (SN) is applied at step S1204. At step S1206, duplicate copies of the Ethernet frame are formed.

At step S1208, the first copy, for transmission on a first 'leg', comprising a radio link between the MN 101*a* and the communications device 104 is selected. At step S1210, the compression profile applicable to transmissions on the first leg is determined.

Subsequently, at step S1212, steps S606 to S614 of the process illustrated in FIG. 6 and described above are carried out in respect of the selected copy of the frame. In some embodiments, step S612 is not carried out; that is, no encryption or integrity protection is applied to the frame.

At step S1214, PDCP PDU comprising the copy of the frame is passed to the RLC entity associated with the corresponding leg.

For downlink data where the leg is that between the MN 101*a* and the communications device 104, the PDCP PDU comprising the copy of the frame is passed to the RLC entity 1124 of the MN 101*a*. Where the leg is that between the SN 101*b* and the communications device 104, the PDCP PDU comprising the copy of the frame is passed to the RLC entity 1134 of the SN 101*b* via the interface 1150.

At step S1216, if both legs have been considered, then control passes to step S1218 and the process ends. If not, then control passes to step S1220, in which the copy associated with the second leg is considered, and the process then continues with step S1210 in respect of the copy associated with the second leg.

In some embodiments, the selected profile determined at step S1210 may be different for each leg. In some embodiments, the profile corresponding to at least one of the legs specifies that compression is not to be applied to any of the header fields, thus ensuring that the possibility of the compressor and decompressor losing synchronisation is significantly decreased.

At step S614 within step S1212, the same PDCP header is added to form each instance of the PDCP PDU, unless the profile is indicated within the PDCP header, in which case only that indication may differ.

Corresponding to the process shown in FIG. 9 and described above for forming PDCP PDUs for transmission, an analogous process may be implemented in respect of received PDCP PDUs.

Specifically, on the receiver side, the packet is passed on to a reordering and duplicate discard block within the PDCP protocol entity 1140, 1114. Based on the PDCP header, it is determined if the received packet is a duplicate of one previously received. If so, then it will be discarded. If, on the other hand, it is the first copy of a particular packet which has been received, then it is passed onto a decompression entity. The decompression entity determines the compression profile used on the sender side, which may depend on the RLC entity at which the packet was received. Accordingly, the decompression entity may determine the RLC entity where it was received. Alternatively, the PDCP header may comprise an indication explicitly indicating the header compression profile used by the transmitter.

Where a profile has been indicated to the receiver both by means of RRC configuration and within the PDCP header, then in some embodiments the profile indicated in PDCP header takes priority.

The later part will require changes to PDCP header to indicate the Ethernet header compression profile used by the transmitter.

A benefit of using different profiles is that the communications resources needed to transmit the data may be reduced by compressing the packets while at the same time avoiding any possibility of compression state mismatch between sender and receiver.

In some embodiments, the infrastructure equipment 101*a* configures different header compression profiles for communicating data between the communications device 104 and the MN 101*a* by means of RRC signalling.

In some embodiments, the header compression profiles may be changeable at the time of a handover, in order to reflect different capabilities or rules applied by a target infrastructure equipment.

In some embodiments, dual connectivity may be configured, so that particular data may be transmitted either directly between the MN 101*a* and the communications device 104, or via the SN 101*b*. In other words, duplication does not occur. Accordingly, the process of FIG. 9 may be adapted by removing steps S1206, S1216 and S1220, and by replacing step S1208 by step S1208*a*, in which it is determined on which leg the data is to be transmitted.

As described above, in general a selected compression profile may be adapted based on decompressor success and/or radio channel conditions. In some embodiments, the selected compression profile is adapted in accordance with a predetermined algorithm known to both the transmitter and the receiver.

For example, according to the algorithm, the profile may be adjusted to the adjacent profile in which the number of fields to which compression is applied is increased, if more than 2 of the last 10 Ethernet headers could not be successfully decompressed.

The algorithms and/or their parameters may be configured by the MN 101*a* by RRC configuration.

Conventionally, when duplication is applied, a timer may be used to determine whether or not a given packet should be duplicated. In some embodiments of the present technique, the same timer is used to adjust the selected compression profile for each leg. Specifically, for example, a timer used to determine if a packet should be duplicated may in some embodiments, also be used to decide if a different compression profile should be used on different legs.

Accordingly, where it is determined that it is unlikely that duplication will occur based on the timer, it may be determined to apply compression to at least some fields of the header of the frame, regardless of the leg on which the frame is to be transmitted.

In some embodiments, the actual profile used on each leg may be changed dynamically using a MAC control element (CE).

In some embodiments, the techniques described herein are applied only in respect of data frames being associated with one or more of a quality of service requirement for a probability of successful reception which exceeds a predetermined reliability threshold, and a quality of service requirement for a maximum permitted latency of transmission which is below a predetermined latency threshold. For example, one or more techniques may be applied only if a data frame is determined to be associated with a URLLC service, as specified in a particular release of a 3GPP specification.

Above have been given descriptions of example processes combining sequences of steps and messages in combination. The scope of the present disclosure is not, however, limited to such specific combinations and in some embodiments, various of the steps and messages described may be omitted, or combined in a different order, or modified.

Thus there has been described a method of transmitting data in a wireless communications system, the method comprising identifying within the data a data frame having a protocol header, the protocol header comprising a plurality of protocol header fields and associated with a medium access control (MAC) frame format for data transmission within a local area network (LAN), determining a selected profile for header compression, the profile being selected from a plurality of predetermined profiles, each of the plurality of predetermined profiles specifying a subset of the protocol header fields, and applying compression to a subset of the protocol header fields in accordance with the selected profile to form a compressed data frame for transmission on a wireless access interface of the wireless communications system.

There has further been described a method of receiving data in a wireless communications system, the method comprising receiving the data via a wireless access interface, the data comprising a compressed data frame, determining a selected profile for header compression, the profile being selected from a plurality of predetermined profiles, each of the plurality of predetermined profiles specifying a subset of the protocol header fields, and applying decompression to a subset of the protocol header fields in accordance with the selected profile to form a decompressed protocol header, the protocol header comprising a plurality of protocol header fields and associated with a medium access control (MAC) frame format for data transmission within a local area network (LAN).

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of processing data for transmission in a wireless communications system, the method comprising a) identifying within the data a data frame having a protocol header, the protocol header comprising a plurality of protocol header fields and associated with a medium access control (MAC) frame format for data transmission within a local area network (LAN), b) determining a selected profile for header compression, the profile for header compression being selected from a plurality of predetermined profiles, each of the plurality of predetermined profiles specifying a subset of the protocol header fields, and c) applying compression to a subset of the protocol header fields in accordance with the selected profile for header compression to form a compressed data frame for transmission on a wireless access interface of the wireless communications network.

Paragraph 2. A method according to paragraph 1, wherein the plurality of predetermined profiles comprise a first profile according to which no protocol header fields are compressed, a second profile according to which a plurality of fields are compressed, and a third profile according to which a subset of the plurality of fields are compressed.

Paragraph 3. A method according to paragraph 1 or paragraph 2, the method comprising transmitting the compressed data frame on the wireless access interface.

Paragraph 4. A method according to any of paragraphs 1 to 3, wherein the frame format is an Ethernet or IEEE 802.3 frame format.

Paragraph 5. A method according to any of paragraphs 1 to 4, the method comprising transmitting an indication of the selected profile for header compression.

Paragraph 6. A method according to any of paragraphs 1 to 5, the method comprising forming a packet data convergence protocol (PDCP) protocol data unit (PDU) comprising the compressed data frame.

Paragraph 7. A method according to paragraph 6, wherein the PDCP PDU comprises an indication of the selected profile for header compression.

Paragraph 8. A method according to any of paragraphs 1 to 7, the method comprising determining whether conditions for modifying the selected profile for header compression are satisfied and, if the conditions for modifying the selected profile for header compression are satisfied, modifying the selected profile for header compression and repeating steps a)-c) for subsequent data in accordance with the modified selected profile for header compression.

Paragraph 9. A method according to paragraph 8, wherein modifying the selected profile comprises selecting from the plurality of predetermined profiles the modified selected profile for header compression.

Paragraph 10. A method according to paragraph 8 or paragraph 9, the method comprising determining a quality of a radio channel of the wireless access interface, and wherein the conditions for modifying the selected profile for header compression comprise conditions based on the quality of the radio channel.

Paragraph 11. A method according to any of paragraphs 8 to 10, the method comprising receiving an decompressor status indication, the decompressor status indication indicating whether an attempt to apply decompression to the compressed data frame to reconstruct the protocol header fields was successful, wherein the conditions for modifying the selected profile for header compression comprise conditions based on the received decompressor status.

Paragraph 12. A method according to any of paragraphs 8 to 11, the method comprising determining a number of sequential frames that have been compressed in accordance with the selected profile for header compression since the selected profile was most recently modified, wherein the conditions for modifying the selected profile for header compression comprise conditions based on the determined number.

Paragraph 13. A method according to any of paragraphs 8 to 12, wherein the conditions for modifying the selected profile for header compression comprise conditions based on the current selected profile for header compression.

Paragraph 14. A method according to any of paragraphs 1 to 13, wherein in accordance with one of the plurality of predetermined profiles, no header fields are compressed.

Paragraph 15. A method according to any of paragraphs 1 to 14, the method comprising ciphering the compressed data frame.

Paragraph 16. A method according to any of paragraphs 1 to 15, the method comprising applying an integrity protection function to the compressed data frame.

Paragraph 17. A method of processing data for transmission in a wireless communications system in a dual connectivity configuration, the method comprising forming a first compressed data frame in accordance with the method of any of paragraphs 1 to 14 for transmission via a first infrastructure equipment, selecting a second selected profile for header compression, the profile being selected from the plurality of predetermined profiles, applying compression to a second subset of the protocol header fields in accordance with the second selected profile for header compression to form a second compressed data frame for transmission on a wireless access interface of the wireless communications system via a second infrastructure equipment.

Paragraph 18. A method according to paragraph 17, wherein the first compressed data frame and the second compressed data frame comprise the same medium access control client data.

Paragraph 19. A method according to paragraph 17 or paragraph 18, wherein in accordance with one of the selected profile for header compression and the second selected profile for header compression, no header fields are compressed.

Paragraph 20. A method according to paragraph 17 or paragraph 18, the method comprising transmitting the first compressed data frame by a first infrastructure equipment to a communications device in a first cell, and transmitting the second compressed data frame by the first infrastructure equipment to a second infrastructure equipment for transmission to the communications device in a second cell.

Paragraph 21. A method according to any of paragraphs 1 to 20, the method comprising transmitting an indication of the plurality of predetermined profiles.

Paragraph 22. A method according to paragraph 17 or paragraph 18, the method comprising transmitting the compressed data frame by a communications device to a first infrastructure equipment in a first cell, and transmitting the second compressed data frame by the communications device to a second infrastructure equipment in a second cell.

Paragraph 23. A method according to any of paragraphs 1 to 18, the method comprising receiving an indication of the plurality of predetermined profiles.

Paragraph 24. A method according to any of paragraphs 1 to 23, wherein the data frame is associated with a quality of service requirement for a probability of successful reception which exceeds a predetermined reliability threshold, and a quality of service requirement for a maximum permitted latency of transmission which is below a predetermined latency threshold.

Paragraph 25. A method according to any of paragraphs 1 to 24, wherein the data frame is associated with an ultra reliable low latency communications (URLLC) service.

Paragraph 26. A method of processing data transmitted in a wireless communications system, the method comprising identifying within the data a compressed data frame comprising protocol header fields, determining a selected profile for header compression, the profile being selected from a plurality of predetermined profiles, each of the plurality of predetermined profiles specifying a subset of protocol header fields, and applying decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Paragraph 27. A method according to paragraph 26, the method comprising receiving the data via a wireless access interface, the data comprising the compressed data frame.

Paragraph 28. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to identify within data for transmission on the wireless access interface a data frame having a protocol header, the protocol header comprising a plurality of protocol header fields and associated with a medium access control (MAC) frame format for data transmission within a local area network (LAN), to determine a selected profile for header compression, the profile for header compression being selected from a plurality of predetermined profiles, each of the plurality of predetermined profiles specifying a subset of the protocol header fields, and to apply compression to a subset of the protocol header fields in accordance with the selected profile for header compression to form a compressed data frame for transmission on a wireless access interface of the wireless communications network.

Paragraph 29. A communications device according to paragraph 28, wherein the controller is configured to control the transmitter so that the communications device is operable to transmit the compressed data frame on the wireless access interface.

Paragraph 30. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to identify within data for transmission on the wireless access interface a data frame having a protocol header, the protocol header comprising a plurality of protocol header fields and associated with a medium access control (MAC) frame format for data transmission within a local area network (LAN), to determine a selected profile for header compression, the profile for header compression being selected from a plurality of predetermined profiles, each of the plurality of predetermined profiles specifying a subset of the protocol header fields, and to apply compression to a subset of the protocol header fields in accordance with the selected profile for header compression to form a compressed data frame for transmission on a wireless access interface of the wireless communications network.

Paragraph 31. Circuitry for a communications device according to paragraph 30, wherein the controller circuitry is configured to control the transmitter circuitry so that the communications device is operable to transmit the compressed data frame on the wireless access interface.

Paragraph 32. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to identify within data transmitted on the wireless access interface a compressed data frame comprising protocol header fields, to determine a selected profile for header compression, the profile being selected from a plurality of predetermined profiles, each of the plurality of predetermined profiles specifying a subset of protocol header fields, and to apply decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Paragraph 33. A communications device according to paragraph 32, wherein the controller is configured to control the receiver so that the communications device is operable to receive the data via the wireless access interface.

Paragraph 34. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to identify within data transmitted on the wireless access interface a compressed data frame comprising protocol header fields, to determine a selected profile for header compression, the profile being selected from a plurality of predetermined profiles, each of the plurality of predetermined profiles specifying a subset of protocol header fields, and to apply decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Paragraph 35. Circuitry for a communications device according to paragraph 34, wherein the controller circuitry is configured to control the transmitter circuitry so that the communications device is operable to receive the data via the wireless access interface.

Paragraph 36. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to identify within data for transmission on the wireless access interface a data frame having a protocol header, the protocol header comprising a plurality of protocol header fields and associated with a medium access control (MAC) frame format for data transmission within a local area network (LAN), to determine a selected profile for header compression, the profile for header compression being selected from a plurality of predetermined profiles, each of the plurality of predetermined profiles specifying a subset of the protocol header fields, and to apply compression to a subset of the protocol header fields in accordance with the selected profile for header compression to form a compressed data frame for transmission on a wireless access interface of the wireless communications network.

Paragraph 37. Infrastructure equipment according to paragraph 36, wherein the controller is configured to control the transmitter so that the communications device is operable to transmit the compressed data frame on the wireless access interface.

Paragraph 38. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to identify within data for transmission on the wireless access interface a data frame having a protocol header, the protocol header comprising a plurality of protocol header fields and associated with a medium access control (MAC) frame format for data transmission within a local area network (LAN), to determine a selected profile for header compression, the profile for header compression being selected from a plurality of predetermined profiles, each of the plurality of predetermined profiles specifying a subset of the protocol header fields, and to apply compression to a subset of the protocol header fields in accordance with the selected profile for header compression to form a compressed data frame for transmission on a wireless access interface of the wireless communications network.

Paragraph 39. Circuitry for an infrastructure equipment according to paragraph 38, wherein the controller circuitry is configured to control the transmitter circuitry so that the communications device is operable to transmit the compressed data frame on the wireless access interface.

Paragraph 40. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to identify within data transmitted on the wireless access interface a compressed data frame comprising protocol header fields, to determine a selected profile for header compression, the profile being selected from a plurality of predetermined profiles, each of the plurality of predetermined profiles specifying a subset of protocol header fields, and to apply decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Paragraph 41. An infrastructure equipment according to paragraph 40, wherein the controller is configured to control the receiver so that the communications device is operable to receive the data via the wireless access interface.

Paragraph 42. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to identify within data transmitted on the wireless access interface a compressed data frame comprising protocol header fields, to determine a selected profile for header compression, the profile being selected from a plurality of predetermined profiles, each of the plurality of predetermined profiles specifying a subset of protocol header fields, and to apply decompression to a subset of the protocol header fields in accordance with the selected profile to form a decompressed protocol header, the decompressed protocol header comprising a plurality of protocol header fields and associated with a medium access control (MAC) frame format for data transmission within a local area network (LAN).

Paragraph 43. Circuitry for an infrastructure equipment according to paragraph 42, wherein the controller circuitry is configured to control the transmitter circuitry so that the communications device is operable to receive the data via the wireless access interface.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018

[2] Holma H. and Toskala A, "LTE for UMTS OFDMA and SC-FDMA based radio access", John Wiley and Sons, 2009

What is claimed is:

1. A method of processing data for transmission in a wireless communications system, the method comprising:

a) identifying within the data a data frame having a protocol header, the protocol header comprising a plurality of protocol header fields and associated with a medium access control (MAC) frame format for data transmission within a local area network (LAN), b) duplicating the data frame to form a first data frame and a second data frame, c) determining a selected first profile for header compression based an indication of decompression success with respect to previously transmitted data frames, the selected first profile for header compression being selected from a plurality of predetermined profiles, each of the plurality of predetermined profiles specifying a subset of the protocol header fields, d) applying compression to at least a subset of the protocol header fields of the first data frame in accordance with the selected first profile for header compression to form a first compressed data frame for transmission on a wireless access interface of the wireless communications network, e) determining a second selected profile for header compression from the plurality of predetermined profiles, f) applying compression to at least a subset of the protocol header fields of the second data frame in accordance with the second selected profile for header compression to form a second compressed data frame for transmission on the wireless access interface, and g) forming a first packet data convergence protocol (PDCP) protocol data unit (PDU) comprising the first compressed data frame, and forming a second PDCP PDU comprising the second compressed data frame, wherein the first PDCP PDU comprises an indication of the selected first profile for header compression, the second PDCP PDU comprises an indication of the second selected profile for header compressing, and the indication of decompression success is received in a PDCP header of an uplink frame, and at least one of the first selected profile for header compression or the second selected profile header for compression is modified based on a number of consecutive decompression failures.

2. The method according to claim 1, wherein the plurality of predetermined profiles comprise a first profile according to which no protocol header fields are compressed, a second profile according to which a plurality of fields are compressed, and a third profile according to which a subset of the plurality of fields are compressed.

3. The method according to claim 1, the method comprising transmitting the first compressed data frame and the second compressed data frame on the wireless access interface.

4. The method according to claim 1, wherein the frame format is an Ethernet or IEEE 802.3 frame format.

5. The method according to claim 1, the method comprising transmitting an indication of at least one of the selected first profile for header compression or the selected second profile for header compression.

6. The method according to claim 1, the method comprising:

determining whether conditions for modifying at least one of the selected first profile for header compression or the selected second provide for header compression are satisfied and, if the conditions for modifying are satisfied, modifying the at least one of the first selected profile for header compression or the second selected profile for header compression and repeating steps a)-g) for subsequent data in accordance with the modified at least one of the first selected profile for header compression or the second selected profile for header compression.

7. The method according to claim 6, wherein modifying the at least one of the first selected profile for header compression or the second profile for header compression comprises selecting from the plurality of predetermined profiles the modified at least one of the first selected profile for header compression or the second selected profile for header compression.

8. The method according to claim 6, the method comprising:

determining a quality of a radio channel of the wireless access interface, and wherein the conditions for modifying the at least one of the first selected profile for header compression or the second selected profile for header compression comprise conditions based on the quality of the radio channel.

9. The method according to claim 6, the method comprising:

determining a number of sequential frames that have been compressed in accordance with the at least one of the first selected profile for header compression or the second selected profile for header compression since a most recent modification thereof, wherein the conditions for modifying the at least one of the first selected profile for header compression or the second selected profile for header compression comprise conditions based on the determined number.

10. The method according to claim 6, wherein the conditions for modifying the at least one of the first selected profile for header compression or the second selected profile for header compression comprise conditions based on a current first selected profile for header compression and a current second selected profile for header compression.

11. The method according to claim 1, wherein in accordance with one of the plurality of predetermined profiles, no header fields are compressed.

12. The method according to claim 1, the method comprising ciphering the compressed data frame.

13. The method according to claim 1, the method comprising applying an integrity protection function to the compressed data frame.

14. The method according to claim 1, further comprising:

determining the number of consecutive decompression failures based on the indication of decompression success; and the at least one of the first selected profile for header compression or the second selected profile header for compression is modified if the number of consecutive decompression failures exceeds a predetermined threshold.

15. The method according to claim 1, further comprising:

measuring a quality metric of the radio channel, wherein the quality metric includes at least one of signal-to-noise ratio (SNR), bit error rate (BER), or packet loss rate; and selecting at least one of the first profile for header compression or the second selected profile for header compression based on the measured quality metric.

16. The method according to claim 1, further comprising:

transmitting an initial uncompressed data frame to establish a compression context; and subsequently applying compression to data frames based on at least one of the first selected profile for header compression or the second selected profile for header compression.

17. A communications device for use in a wireless communications network, the wireless communications network comprising an infrastructure equipment providing a wireless access interface, the communications device comprising:

a transmitter configured to transmit data via the wireless access interface, a receiver configured to receive signals, and a controller configured to control the transmitter and the receiver so that the communications device is configured to:

identify within data for transmission on the wireless access interface a data frame having a protocol header, the protocol header comprising a plurality of protocol header fields and associated with a medium access control (MAC) frame format for data transmission within a local area network (LAN), duplicate the data frame to form a first data frame and a second data frame, determine a first selected profile for header compression based an indication of decompression success with respect to previously transmitted data frames, the selected first profile for header compression being selected from a plurality of predetermined profiles, each of the plurality of predetermined profiles specifying a subset of the protocol header fields, apply compression to at least a subset of the protocol header fields of the first data frame in accordance with the selected profile for header compression to form a first compressed data frame for transmission on a wireless access interface of the wireless communications network, determine a second selected profile for header compression from the plurality of predetermined profiles, apply compression to at least a subset of the protocol header fields of the second data frame in accordance with the second selected profile for header compression to form a second compressed data frame for transmission on the wireless access interface, and form a first packet data convergence protocol (PDCP) protocol data unit (PDU) comprising the first compressed data frame, and form a second PDCP PDU comprising the second compressed data frame, wherein the first PDCP PDU comprises an indication of the first selected profile for header compression, the second PDCP PDU comprises an indication of the second selected profile for header compression, and the indication of decompression success is received in a PDCP header of an uplink frame, and at least one of the first selected profile for header compression or the second selected profile header for compression is modified based on a number of consecutive decompression failures.

18. The communications device according to claim 17, wherein the controller is configured to control the transmitter so that the communications device is operable to transmit the first compressed data frame and the second compressed data frame on the wireless access interface.

19. Infrastructure equipment for use in a wireless communications network, the infrastructure equipment providing a wireless access interface, the infrastructure equipment comprising:

a transmitter configured to transmit signals to a communications device via the wireless access interface in a cell, a receiver configured to receive data from the communications device, and a controller, configured to control the transmitter and the receiver so that the infrastructure equipment is configured to:

identify within data for transmission on the wireless access interface a data frame having a protocol header, the protocol header comprising a plurality of protocol header fields and associated with a medium access control (MAC) frame format for data transmission within a local area network (LAN), duplicate the data frame to form a first data frame and a second data frame, determine a first selected profile for header compression based an indication of decompression success with respect to previously transmitted data frames, the first profile for header compression being selected from a plurality of predetermined profiles, each of the plurality of predetermined profiles specifying a subset of the protocol header fields, apply compression to at least a subset of the protocol header fields of the first data frame in accordance with the first selected profile for header compression to form a first compressed data frame for transmission on a wireless access interface of the wireless communications network, determine a second selected profile for header compression from the plurality of predetermined profiles, apply compression to at least a subset of the protocol header fields of the second data frame in accordance with the second selected profile for header compression to form a second compressed data frame for transmission on the wireless access interface, and form a first packet data convergence protocol (PDCP) protocol data unit (PDU) comprising the first compressed data frame, and form a second PDCP PDU comprising the second compressed data frame, wherein the first PDCP PDU comprises an indication of the first selected profile for header compression, the second PDCP PDU comprises an indication of the second selected profile for header compression, and the indication of decompression success is received in a PDCP header of an uplink frame, and at least one of the first selected profile for header compression or the second selected profile header for compression is modified based on a number of consecutive decompression failures.

20. The infrastructure equipment according to claim 19, wherein the controller is configured to control the transmitter so that the communications device is operable to transmit the first compressed data frame and the second compressed data frame on the wireless access interface.

* * * * *